United States Patent Office
3,435,408
Patented Mar. 25, 1969

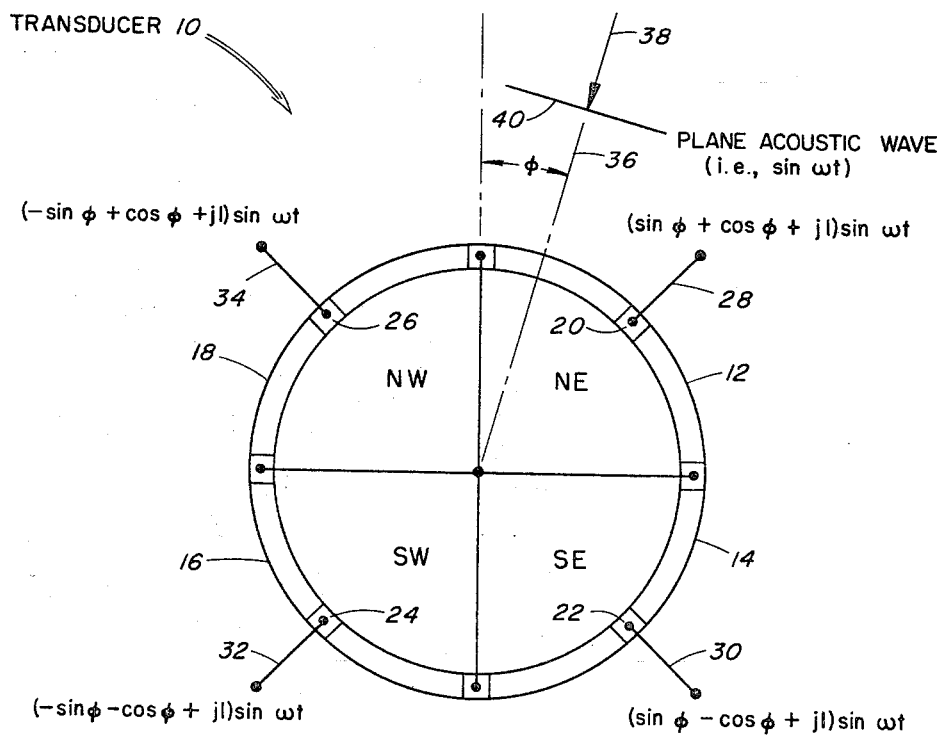
FIG. 1 - PRIOR ART
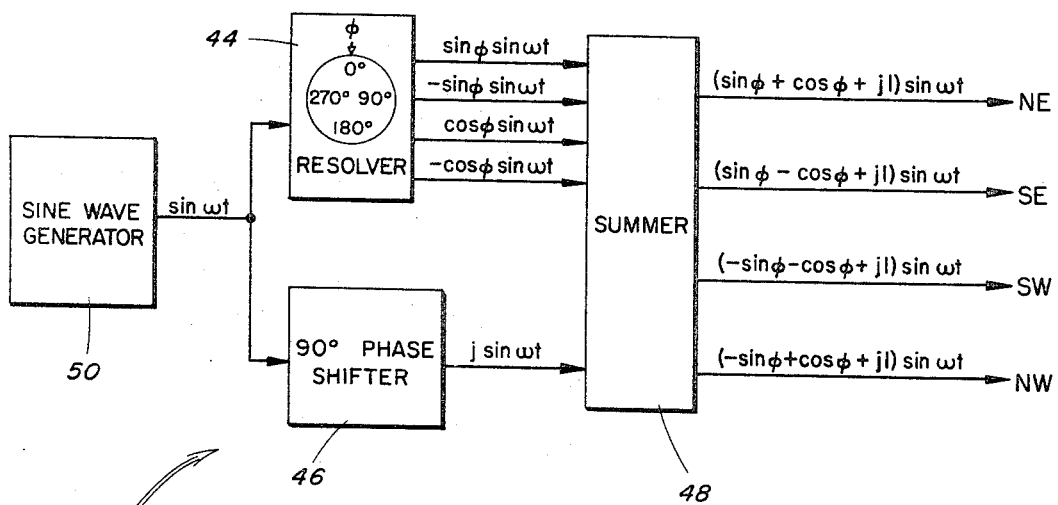
FIG. 3
INVENTOR
Roy C. Moore

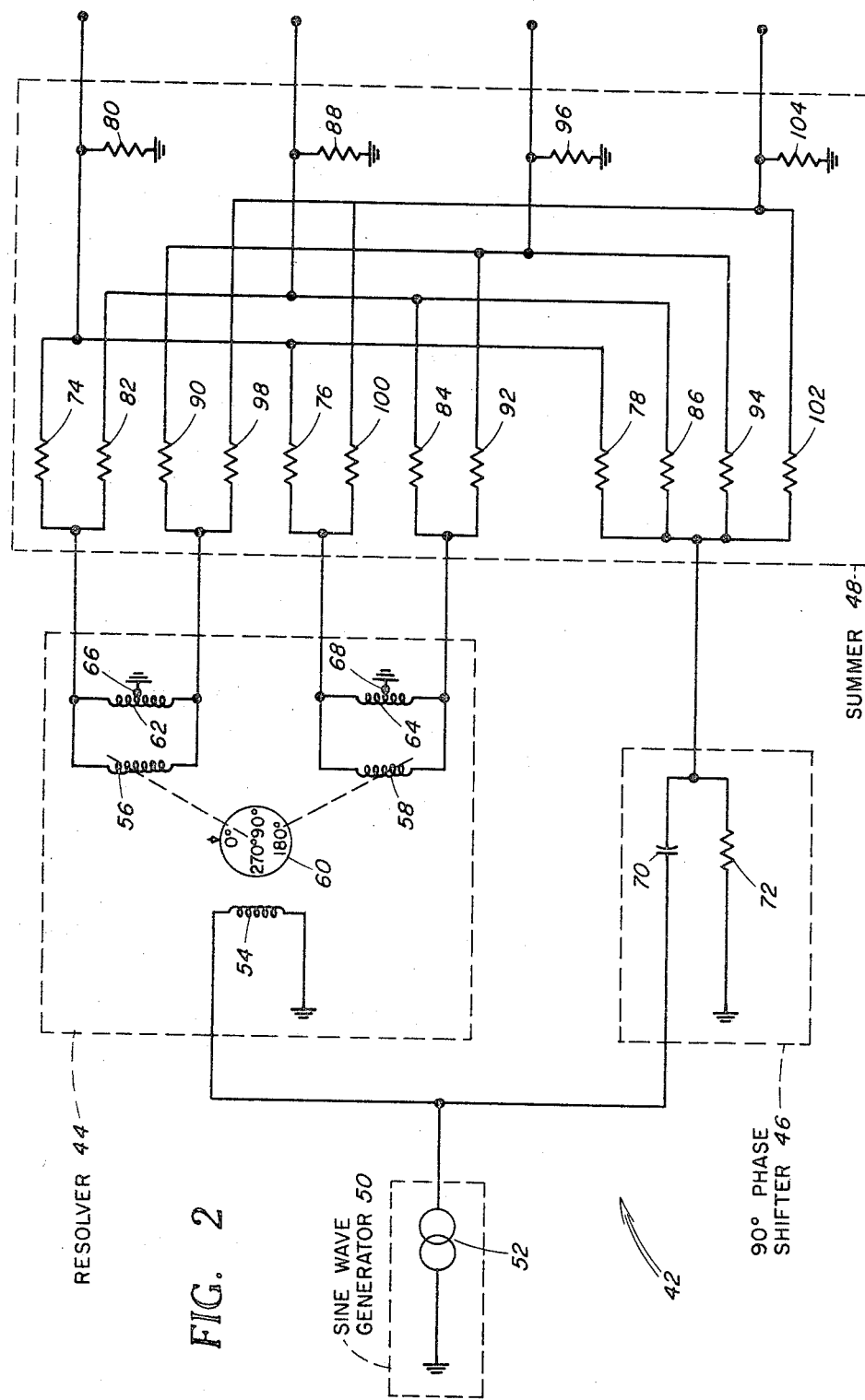

3,435,408
MULTIMODE HYDROPHONE TRANSDUCER SIMULATOR
Roy C. Moore, Bristol, R.I., assignor, by mesne assignments, to the United States of America as represented by the Secretary of the Navy
Filed Sept. 19, 1967, Ser. No. 668,970
Int. Cl. H04b 13/02
U.S. Cl. 340—5       4 Claims

ABSTRACT OF THE DISCLOSURE

An electrical circuit for simulating the output of a multimode hydrophone transducer as the transducer is exposed to any plane acoustic wave. The output of a signal generator, which represents the plane acoustic wave, is simultaneously applied to both a resolver, which multiplies the signal by $\pm\sin\phi$ and $\pm\cos\phi$, where $\phi$ is any preset azimuthal arrival angle of the wave, and to a 90° phase shifter. The outputs of the resolver, as well as that of the phase shifter, are combined in a summer which yields four resultant outputs of $(\sin\phi+\cos\phi+j1)$, $(\sin\phi-\cos\phi+j1)$, $(-\sin\phi-\cos\phi+j1)$ and $$(-\sin\phi+\cos\phi+j1)$$

each multiplied by the output signal from the signal generator, thereby simulating the transducer output in response to such signal.

Background of the invention

The present invention relates to signal simulators and more particularly to a circuit for simulating the output of certain multimode hydrophone transducers.

In the field of directional sonar systems of the type disclosed by S. L. Ehrlich in U.S. Patent 3,176,262 issued Mar. 30, 1965, it has been the general practice, in order to insure accurate true bearing indications of targets, to align the system gyro compass with the system transducer, for example, a multimode hydrophone transducer, in the following manner. The transducer is acoustically aligned with an indexing mark on an exposed surface of the sea unit or, alternatly, the location of the mark is determined on the basis of the acoustic characteristics of the transducer; therafter, the alignment of the gyro compass with this mark insures that the subsequent conversion of the electrical signals in relative form will consistently provide accurate (magnetic) true bearing information of targets irrespective of the instantaneous position of the transducer. These techniques are disclosed in the aforementioned patent to Ehrlich et al. Although, in general, such alignment techniques have served their purpose, they have been cumbersome and difficult to perform in a laboratory environment because of the necessity of a large tank of water in which to produce a plane acoustic wave having a selectable bearing, or azimuthal, arrival angle.

Summary of the invention

The general purpose of this invention is to provide a device by which directional sonar systems may be aligned in a laboratory environment without requiring either a transducer or a large tank of water in which to produce a plane acoustic wave of a selectable azimuthal arrival angle. To attain this purpose, the present invention contemplates a unique electrical circuit, the output of which simulates the output of the hydrophone transducer in response to a plane acoustic wave of a selectable azimuthal arrival angle.

Accordingly, an object of the present invention is to provide a circuit for simulating the output of a multimode hydrophone transducer.

An object of the present invention is also to provide a new and improved simulating circuit for aligning directional sonar systems.

Another object is to provide a new and improved simulating circuit for aligning directional sonar systems which employ multimode hydrophone transducers.

A further object of the invention is the provision of simulating circuitry for aligning directional sonar systems which employ multimode hydrophone transducers wherein the alignment may be accomplished in the laboratory.

Still another object is to provide simulating circuitry for aligning directional sonar systems which employ multimode hydrophone transducers wherein the alignment may be accomplished in the laboratory without either a multimode hydrophone transducer or a large tank or body of water in which to produce a plane acoustic wave of a selectable azimuthal arrival angle.

Yet another object of the present invention is the provision of a multimode hydrophone transducer simulator for the alignment of directional sonar systems which employ multimode hydrophone transducers wherein the alignment may be accomplished in the laboratory without either a multimode hydrophone transducer or a large tank or body of water in which to produce a plane acoustic wave of any selectable azimuthal arrival angle.

According to the present invention, the foregoing and other objects are attained by (1) generating four output signals which are the products of an input signal and of $\pm\sin\phi$ and $\pm\cos\phi$, where $\phi$ is any preselected azimuthal arrival angle of a simulated plane acoustic wave, (2) generating an output signal which is 90° out of phase with said input signal, and (3) combining the above identified output signals to produce four ultimate output signals which are the products of the original input signal and $(\sin\phi+\cos\phi+j1)$, $(\sin\phi-\cos\phi+j1)$, $$(-\sin\phi-\cos\phi+j1)$$

and $(-\sin\phi+\cos\phi+j1)$, respectively.

Brief description of the drawings

A more complete appreciation of the invention and many of the attendant advantages thereof will be readily appreciated as the same becomes better understood by reference to the following detailed description when considered in connection with the accompanying drawings wherein:

FIG. 1 is a schematic diagram of a prior art multimode hydrophone transducer;

FIG. 2 is a schematic diagram of a preferred embodiment of the multimode hydrophone simulator of the present invention; and FIG. 3 is a block diagrammatic view of the same preferred embodiment of the present invention.

Description of the preferred embodiment

Referring now to the drawings wherein like reference characters designate identical or corresponding parts throughout the several views, and more particularly to FIG. 1 thereof, wherein reference numeral 10 indicates generally a prior art multimode hydrophone transducer such as that disclosed in the aforementioned U.S. patent to Ehrlich et al. The multimode hydrophone transducer is cylindrical in shape and is divided into four quadrants 12, 14, 16 and 18 which are also labeled NE, SE, SW, and NW, respectively. Each quadrant has an output terminal 20, 22, 24 and 26 to which there may be connected an appropriate lead wire 28, 30, 32 and 34. Approaching multimode hydrophone transducer 10 radially along center line 36 in the direction of arrowhead 38 at a bearing, or azimuthal, arrival angle 46, there is shown a plane acoustic wave 40 which, in the preferred embodiment, is a sine wave of angular frequency $w$. It should be understood that a sine wave has been used as the plane acoustic wave herein for simplicity to describe the operation of the simulator, but nonetheless that operation on other signals, such as random noise, FM, or any coded pulse is contemplated merely by the appropriate substitution of components as will be more fully explained hereinafter. As shown in FIG. 1 and as disclosed by the aforementioned patent to Ehrlich et al., each quadrant 12, 14, 16 and 18 of the multimode hydrophone transducer 10 has a particular signal response upon the application of a plane acoustic wave, herein of the form sin $wt$, arriving at an angle $\phi$ which may be summarized in the following manner:

| Quadrant: | Signal voltage |
|---|---|
| NE | $(\sin \phi + \cos \phi + j1) \sin wt$. |
| SE | $(\sin \phi - \cos \phi + j1) \sin wt$. |
| SW | $(-\sin \phi - \cos \phi + j1) \sin wt$. |
| NE | $(-\sin \phi + \cos \phi + j1) \sin wt$. |

The signal voltages in the table above are the quadrant responses of the multimode hydrophone transducer and are, accordingly, the electrical signals which the multimode hydrophone transducer simulator of the present invention is to simulate. It should be noted that each quadrant response may be rewritten in expanded form, merely by multiplying out the term in parenthesis by sin $wt$, so that each quadrant response is composed of some combination of ($\pm \sin \phi \sin wt$) and $$(\pm \cos \phi \sin wt)$$

plus $j \sin wt$. The significance of the expanded form of each quadrant response will become more apparent hereinafter.

Referring now to FIGS. 2 and 3, there are shown schematic diagrams of the multimode hydrophone transducer simulator of the present invention generally identified by reference numeral 42. Simulator 42 consists essentially of a conventional resolver 44, a conventional 90° phase shifter 46, and a conventional summer 48 which are uniquely combined to produce the simulator of the present invention. For purposes of the preferred embodiment as hereinbefore explained, there is shown a sine wave generator 50 connectable to simulator 42. As more clearly shown in FIG. 2, the generator includes a sine wave oscillator 52 having one terminal thereof connected to ground. Sine wave generator 50 simulates the plane acoustic wave to which the transducer, or as here the simulator, responds. The other terminal of oscillator 52 is connected to the input terminal of resolver 44 which includes a synchronous motor having a stator winding 54 and rotor windings 56 and 58. The remaining terminal of stator winding 54 is connected to ground. Rotor windings 56 and 58 are magnetically coupled to stator winding 54 and are mechanically coupled to a dial 60 which, by varying the magnetic coupling of the stator and rotor windings, may be set to any desired azimuthal arrival angle $\phi$ from 0 to 360°. Rotor windings 56 and 58 are connected across inductive windings 62 and 64, respectively, which windings are connected to ground through center taps 66 and 68, respectively. The center taps result in the generation of 180° phase difference signals at the respective output terminals of resolver 44, which terminals are connected to the input terminals of summer 48.

The output terminal of oscillator 52 is also connected to 90° phase shifter 46 which may include an R-C network having a serially connected capacitor 70 and resistor 72 connected between the input terminal and ground. An output terminal, provided at the junction of capacitor 70 and resistor 72, is connected to an input terminal of summer 48.

Within summer 48 resistors 74, 76, and 78 are connected to a common output terminal which is connected above ground by a resistor 80. In a like manner resistors 82, 84 and 86 are connected to a common output terminal above ground by a resistor 88; resistors 90, 92, and 94 are connected to a common output terminal above ground by a resistor 96; and lastly, resistors 98, 100 and 102 are connected to a common output terminal above ground by a resistor 104. The above described resistance network of summer 48 is but one of many conventional summing techniques which might be employed within the contemplation of the present invention.

The operation of the multimode hydrophone transducer simulator may be readily understood by reference to either FIG. 2 or FIG. 3. Simulating a plane acoustic wave, sine wave generator 50 generates a signal of a waveform of sin $wt$ which is fed simultaneously to both the 90° phase shifter 46 and the resolver 44. In response to the sin $wt$ input, phase shifter 46 generates an output signal of ($j \sin wt$) due to the 90° phase shift action of the R-C network; this output signal is fed into summer 48. Simultaneously therewith the sin $wt$ signal is fed to the synchronous motor stator winding 68 of resolver 44 of which the dial has been preset to the desired azimuthal arrival $\phi$ between 0 and 360° of the acoustic signal to be received. Since rotor windings 56 and 58 are mechanically coupled to dial 60, output signals of the form sin $\phi$ sin $wt$, $-\sin \phi$ sin $wt$ and cos $\phi$ sin $wt$, $-\cos \phi$ sin $wt$ are developed at the output terminals of resolver 44; these output signals are likewise fed to summer 48. The five input signals to the summer are then added in the particular desired combinations by isolating resistors (74, 76, 78), (82, 84, 86), (90, 92, 94), and (98, 100, 102) to generate four ultimate output signals of the form (sin $\phi$ sin $wt$ + cos $\phi$ sin $wt$ + $j$ sin $wt$), $$(\sin \phi \sin wt - \cos \phi \sin wt + j \sin wt)$$

$$(-\sin \phi \sin wt - \cos \phi \sin wt + j \sin wt), \text{ and}$$

$$(-\sin \phi \sin wt + \cos \phi \sin wt + j \sin wt)$$

corresponding to the output signals which would be generated by the NE, SE, SW, and NW quadrants, respectively, of multimode hydrophone transducer 10.

As is further disclosed in the aforementioned patent to Ehrlich et al., the usual way in which the quadrant signals are processed comprises the following operations which may be accomplished using various conventional means:

| Processed signal: | Process signal voltage |
|---|---|
| NS, combined | $(NE+NW)-(SE+SW)=4 \cos \phi \sin wt$. |
| EW, combined | $(NE+SE)-(NW+SW)=4 \sin \phi \sin wt$. |
| OMNI | $(NE+SE)+(SW+NW)=4j \sin wt$. |
| Virtual ground | $(NE+SW)-(NW+SE)=0$ +higher order modes. |

The three signals, 4 cos $\phi$ sin $wt$, 4 sin $\phi$ sin $wt$, and $4j$ sin $wt$, are fed to the horizontal, vertical, and grid, respectively, of a cathode ray oscilloscope to display a radial line corresponding to the azimuthal arrival angle $\phi$ set on the resolver dial. In such a manner the multimode hydrophone transducer simulator of the present invention may be used to check system bearing accuracy, minimum detectable signal, recovery time response, attack time response, and dynamic range of directional sonar systems without requiring a transducer immersed in a large body of water in which a plane acoustic wave is produced.

Obviously numerous modifications and variations of the present invention are possible in the light of the above teachings. For example, as has been previously indicated, the sine wave generator has been used to describe the operation of the simulator; however, the simulator can also simulate the directions of random noise, FM, or any coded pulse desired by substituting an appropriate properties generator for the sine wave generator. This modification is but illustrative, and in no way limiting, as to variations of the invention which are possible in light of this disclosure. It is therefore to be understood that within the scope of the appended claims, the invention may be practiced otherwise than as specifically described therein.

What is claimed and desired to be secured by Letters Patent of the United States is:

1. A signal simulating system comprising:
   first means for generating a first output signal; and
   second means for receiving said first output signal and for generating a second output signal in the form $(\sin \phi + \cos \phi + j1)$ times said first output signal, a third output signal in the form $(\sin \phi - \cos \phi + j1)$ times said first output signal, a fourth output signal in the form $(-\sin \phi - \cos \phi + j1)$ times said first output signal, and a fifth output signal in the form $(-\sin \phi + \cos \phi + j1)$ times said first output signal.

2. A signal simulating system comprising:
   first circuit means for generating a first output signal;
   second circuit means for receiving said first output signal as a first input signal and for generating a second output signal of the form $\sin \phi$ times said first output signal, a third output signal of the form $-\sin \phi$ times said first output signal, a fourth output signal of the form $\cos \phi$ times said first output signal, and a fifth output signal of the form $-\cos \phi$ times said first output signal;
   third circuit means for simultaneously receiving said first output signal as a second input signal and for generating a sixth output signal of the form $j1$ times said first output signal wherein said sixth output signal represents said first output signal out of phase by 90°; and
   fourth circuit means for receiving said second, third, fourth, fifth, and sixth output signals as third, fourth, fifth, sixth, and seventh input signals, respectively, and for generating a seventh output signal in the form $(\sin \phi + \cos \phi + j1)$ times said first output signal, an eighth output signal in the form
   $$(\sin \phi - \cos \phi + j1)$$
   times said first output signal, a ninth output signal in the form $(-\sin \phi - \cos \phi + j1)$ times said first output signal, and a tenth output signal in the form $(-\sin \phi + \cos \phi + j1)$ times said first output signal.

3. The system of claim 2 wherein said first circuit means comprises a sine wave generator.

4. The system of claim 2 wherein said second circuit means includes means for selectively varying the magnitude of angle $\phi$.

References Cited

UNITED STATES PATENTS

| | | | |
|---|---|---|---|
| 2,955,361 | 10/1960 | Brown | 35—10.4 |
| 3,169,162 | 2/1965 | Kling | 35—10.4 |

RICHARD A. FARLEY, *Primary Examiner.*

U.S. Cl. X. R.

35—10.4; 340—6